Inventors
Miles S. Bajcar
Ditlev Peder Madsen
Vincent S. Sondej

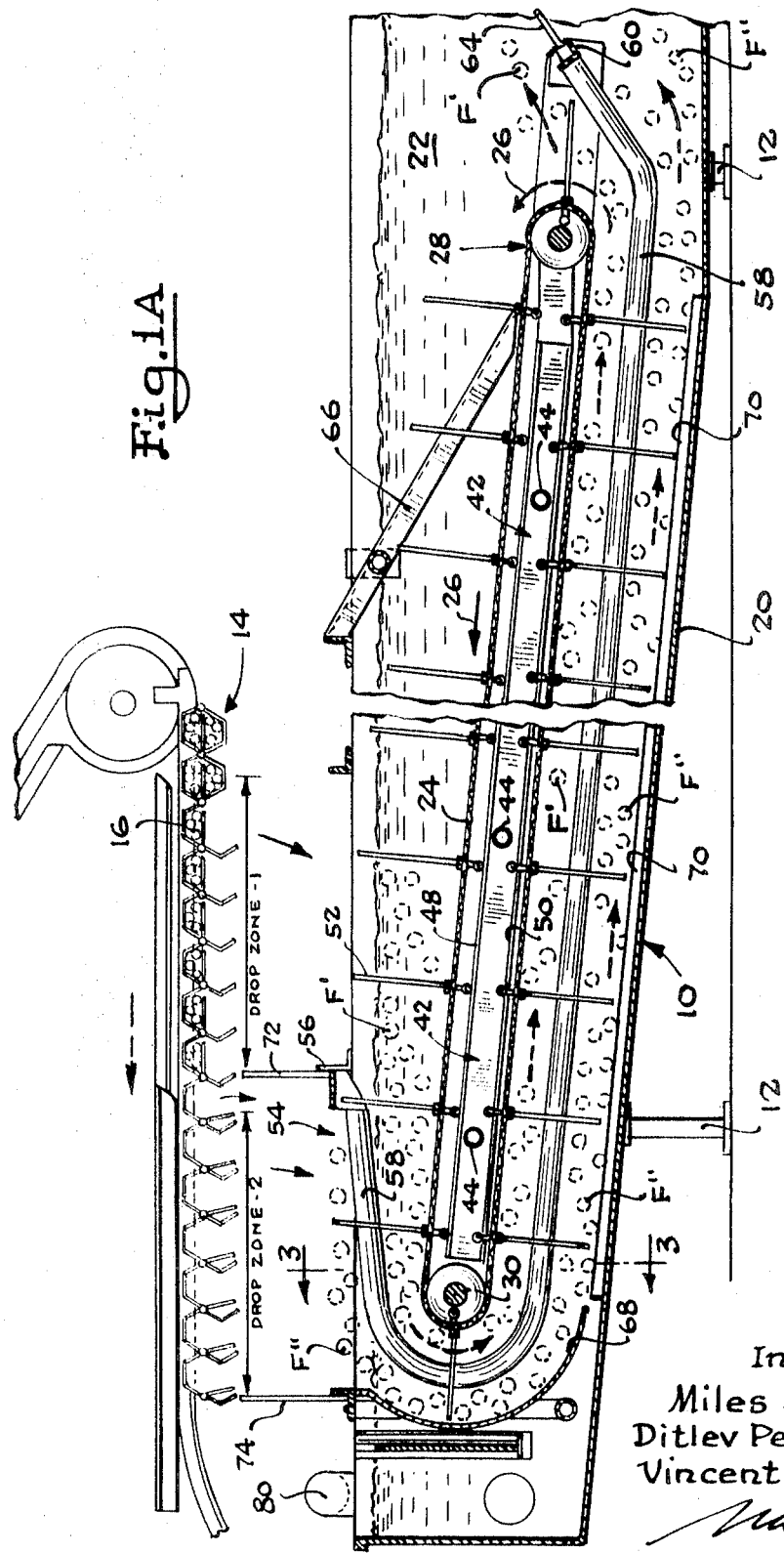

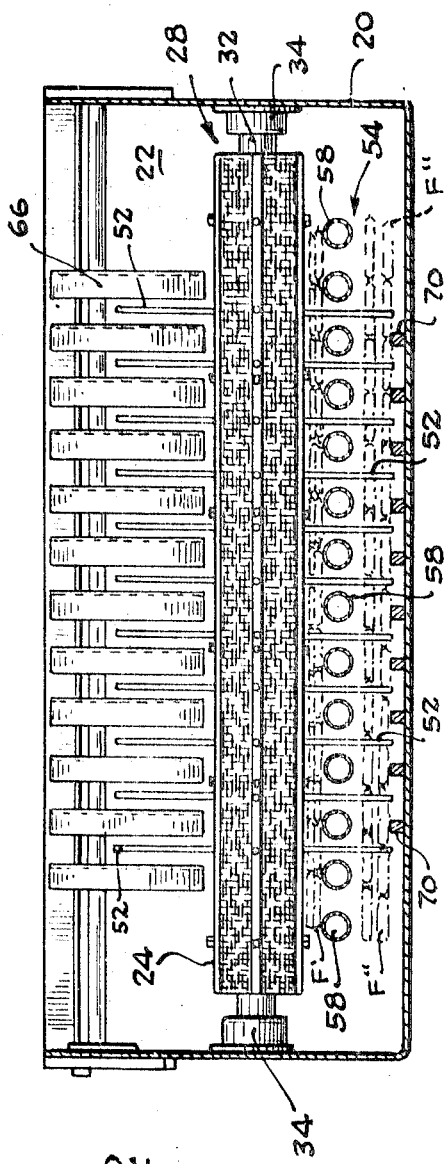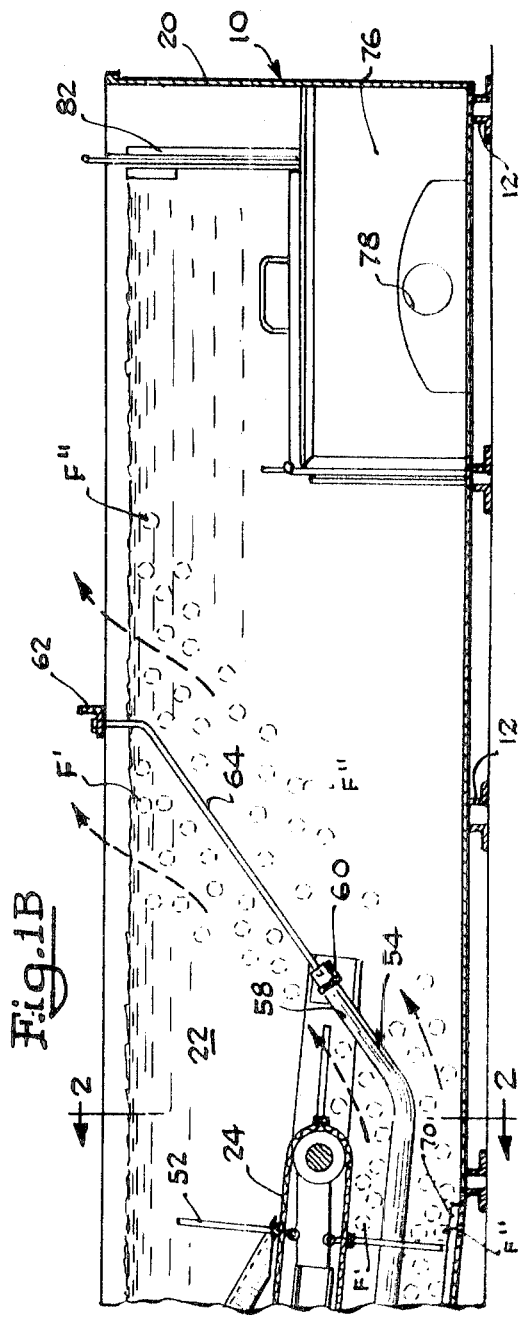

Attorney

United States Patent Office 3,595,672
Patented July 27, 1971

3,595,672
METHOD OF TREATING STRANDS OF SAUSAGE PRODUCTS
Miles S. Bajcar, Chicago, Ditlev Peder Madsen, Palos Park, and Vincent S. Sondej, Chicago, Ill., assignors to Chemetron Corporation, Chicago, Ill.
Original application Oct. 25, 1967, Ser. No. 678,011, now Patent No. 3,482,508, dated Dec. 9, 1969. Divided and this application May 27, 1969, Ser. No. 842,763
Int. Cl. A22c 11/00
U.S. Cl. 99—109
1 Claim

ABSTRACT OF THE DISCLOSURE

Apparatus having a grid which partialy encircles a conveyor carrying spaced rows of pins that extend above and pass through the grid for positively moving discrete portions of a product through a treatment bath.

---

This application is a division of application Ser. No. 678,011, filed Oct. 25, 1967, now Pat. No. 3,482,508, issued Dec. 9, 1969.

This invention relates to process and apparatus for facilitating the treatment and handling of continuous strands of a product and for effecting substantial economies as well as producing a high quality product. In the preferred embodiment sausage products, such as frankfurters, are processed prior to peeling and packaging.

In presently available treatment apparatus, expensive basket conveyors are used to carry frankfurters through an entire processing system which includes the cooking and smoking of the meat product. The basket conveyors, being of a metallic construction, absorb and retain heat during the cooking and smoking steps of the process. These heated baskets are then totally immersed in a treatment bath which cools the product. A large portion of the cooling is wasted because the baskets must be cooled as well as the product. A further disadvantage of known systems is that the portion of the apparatus containing the treatment bath is relatively large because the entire basket conveyor apparatus is moved through the cooling solution. Thus a large area of floor space must be reserved for the treatment tank and a relatively large volume of the treatment bath is required in order to assure complete cooling and treatment of the product moving through the bath. Frequently soot and other objectionable particles are deposited on the conveyor as it passes through the cooking and smoking portions of the processing equipment. These objectionable particles are frequently washed from the conveyors by the treatment bath and in turn contaminate the bath. Further, many of the chemicals in the bath adhere to the conveyors and baskets as they leave the bath. As a result, the chemicals must be cleaned from the baskets periodically and the lost chemicals must be replaced in the bath. Many known cooling and treating apparatus spray the product while it is in the conveyor baskets. For economy large quantities of product are packed in each basket with the result that all sides of the product are not subjected equally to the treatment spray. Thus, unsymmetrical cooling of the product results.

This invention provides a tank which is adapted to hold a supply of fluid, such as brine, for the treatment of the product that is moved through the bath by a continuous mat belt conveyor. The tank has a charging area where the product is introduced into the treatment fluid and a discharge end where the product may be temporarily stored before movement to other apparatus for further handling, such as packaging. The product is delivered, as by dropping, from the separated compartments of divided baskets which continuously pass above the treatment bath.

A slotted separator grid is mounted to partially encompass the belt conveyor. The grid slots are spaced a sufficient distance so that pins mounted on and moving with the mat belt conveyor pass along the slots without interference. The pins are mounted across the conveyor in spaced transverse rows and extend a predetermined distance beyond the surface of the grid so as to form adjacent series of separated compartments for the positive transfer and delivery of portions of the product along two paths. The compartments of product are moved through the treatment bath in this separated manner and are discharged at the opposite end of the conveyor without having been commingled.

It is an object of this invention to provide a product treatment system for uniformly treating a continuous strand of a product and bringing the product to a desired temperature for further processing.

It is a further object of this invention to provide a compact product treatment apparatus having reduced space requirements.

Yet another object of this invention is to provide apparatus in which the supply of treatment fluid is maintained in a sanitary condition and its chemical composition is easily controlled.

An additional object of this invention is to provide uniform treatment of the product passing through apparatus by evenly exposing all sides of the product to the treatment bath.

A feature of this invention is to provide novel means for serially receiving separated portions of the product and for simultaneously moving the separated portions through the treatment bath without commingling.

It is another feature of this invention to provide novel conveyor apparatus mounted in a treatment tank which apparatus is adapted to carry at least two separated strands of cooked frankfurters through a chilled brine bath prior to peeling and packaging.

Another object of this invention is to provide a product treatment apparatus which will handle and treat variable length links of frankfurters having a wide variety of product diameters.

An additional object of this invention is to provide a product treatment system which reduces labor requirements, minimizes clean-up time, and lends itself to an automated line of product processing.

Yet another object of the process and apparatus of this invention is to provide overall higher efficiency and speed capacity.

It is also an object of this invention to provide and maintain uniform processing conditions throughout continued use of the apparatus for accurately controlling the variable qualities in the end product. Thus, day-to-day product uniformity and consistency is achieved and product rejection is reduced and minimized.

Another object of this invention is to provide a product treatment apparatus which is simply integrated into existing automated transfer equipment and is of rugged durable construction.

Further objects as well as features and advantages of this invention will become apparent as the following description of an illustrated embodiment thereof proceeds and is given for the purpose of disclosure and is taken in conjunction with the accompanying drawings in which like character references designate like parts throughout the several views and where:

FIG. 1A is a foreshortened vertical sectional view through the product receiving end of product treatment apparatus incorporating the principles of this invention;

FIG. 1B is a similar view showing the discharge portion of this apparatus;

FIG. 2 is a vertical sectional view taken along the line 2—2 of FIG. 1B looking in the direction indicated by the arrows;

Figure 3:
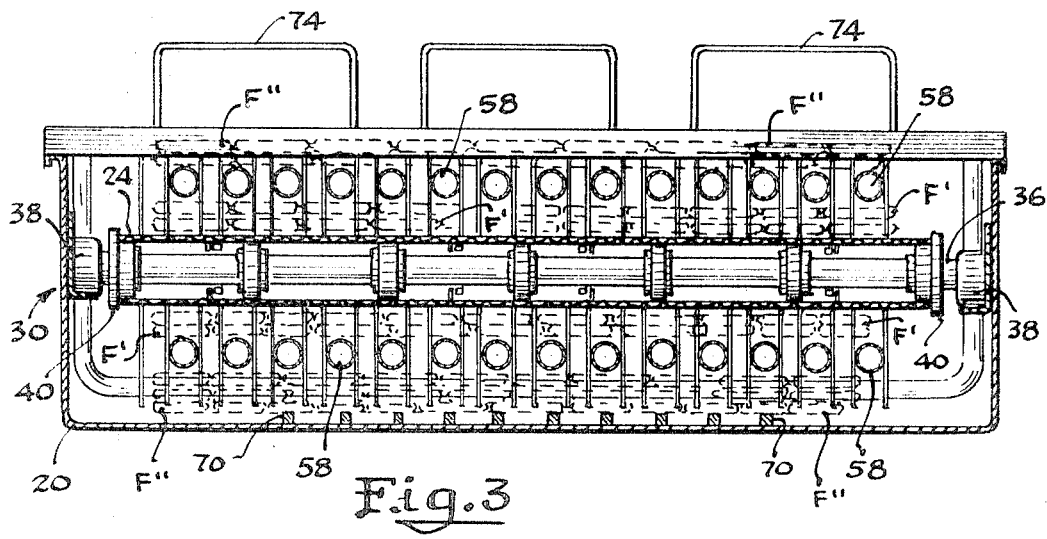
FIG. 3 is a vertical sectional view taken along the line 3—3 of FIG. 1A looking in the direction indicated by the arrows.
Figure 4:
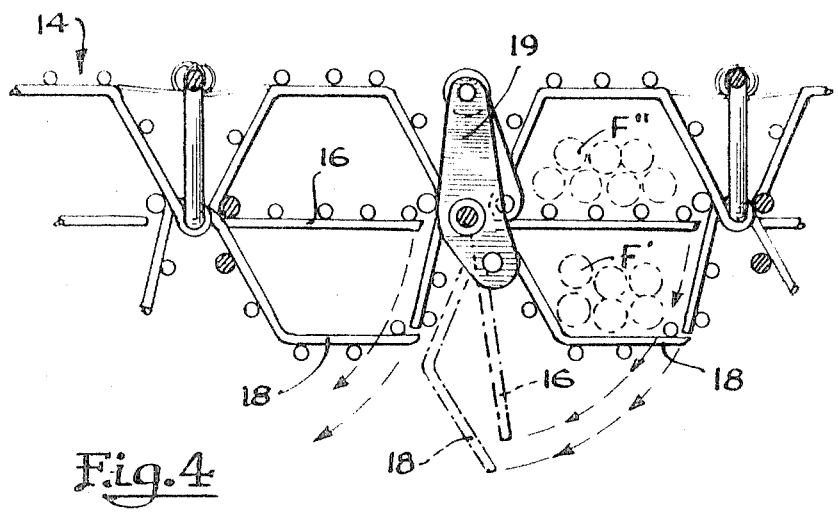
FIG. 4 is a vertical sectional view illustrating divided basket conveyor means for dropping a supply of smoked and cooked frankfurters into the product receiving end of this invention.

Referring now to the several figures and first to FIGS. 1A and 1B, a product treatment apparatus 10 embodying this invention is supported on a floor by suitable legs 12. A product, such as continuous strands of smoked, cooked frankfurters are transferred in divided baskets 14 (FIG. 4) to a product receiving end of the treatment apparatus 10. The divided basket 14 has an upper supporting grill 16 and a lower supporting grill 18 for simultaneously carrying two separated continuous strands F' and F" of the frankfurters which are to be treated. The sides of the basket 14 are partially opened to receive a looped portion of the strands between adjacent baskets so that long strands which fill more than one basket can be processed without being cut. A cam operated linkage 19 is operatively connected to the grills 16 and 18 for regulating their relative movement. Tripping devices (not shown) are positioned along the path of travel of the baskets in the area of the receiving end of the apparatus to actuate the linkage 19. As the baskets move above the apparatus, the lower grill 18 is rotated by the linkage 19 to a generally vertical position (shown in broken lines) and the contents F' are dropped into a first drop zone of the tank. As each basket continues to move, the upper grill 16 is rotated by the linkage 19 to its generally vertical position (shown in broken lines) and the contents F" are dropped through the area of the basket formerly holding the frankfurters F' and into a second drop zone. While the illustrated embodiment is useful for the treatment of continuous strands of frankfurters, this invention is equally suitable for the movement and/or treatment of discrete portions of any product wherein it is desired that uniform treatment be provided without commingling of the product portions.

A generally rectangular tank 20 of the apparatus 10 is proportioned to hold a supply or bath 22 for the cooling and treating of the frankfurters. The treatment bath 22 is a cooled brine solution which chills the previously smoked and cooked frankfurters and prepares them for peeling and further processing. Since the frankfurters enter the tank at an elevated temperature, the brine solution is recirculated and chilled by means (not shown) to a predetermined temperature for providing product uniformity and consistency.

An endless mat belt conveyor 24 is mounted in the fluid with at least its lower run positioned below the fluid level. The conveyor is driven by means (not shown) in the direction of the arrows 26 and is supported between and about a drive shaft assembly 28 and an idler shaft assembly 30. The drive shaft assembly includes a drive shaft 32 which is mounted transversely across the tank and is journalled at its ends in shaft bearings 34 which are conventionally mounted to the walls of the tank 20. The drive shaft is operatively connected to the mat belt conveyor 24 by drive transmitting means such as teeth or sprockets on the shaft which mesh with suitable holes in the mat belt. The idler shaft assembly 30 mounted transversely across the tank and is journalled at both of its ends in bearing housings 38 which are adjustably mounted to the tank walls to provide longtiudinal compliance of the conveyor 24. In this way the tautness of the belt is adjustable and the sag of its runs is regulated. Guide idlers 40 are mounted adjacent the ends of the idler shaft 36 to control and restrict the mat belt from sliding axially of the shaft 36.

A conveyor track support 42 is mounted inside the runs of the conveyor 24 between the drive shaft assembly 28 and the idler shaft assembly 30. The support 42 is attached to the walls of the tank by pipe members 44. Roller bearings are mounted to the inner surface of the conveyor 24 and are positioned to be supported on an upper support rail 48 and a lower support rail 50 of the conveyor track support for sustaining the upper and lower runs of the conveyor 24 between the shaft assemblies 28 and 30. The drive sprockets on the shaft assemblies 28 and 30 are spaced from the surface of the shafts so that the roller bearing means pass about the shafts without interfering with the movement of the conveyor 24.

A plurality of spaced pins 52 are mounted transversely on the conveyor 24 and extend in a generally perpendicular direction away from the outer surface of the conveyor 24. Rows of the spaced pins form a series of product receiving compartments for the admission and positive transfer of the frankfurters by the moving conveyor.

Slotted separator grid means, indicated generally at 54, is mounted to partially encompass the path of the conveyor 24. An angle bracket 56 is mounted across the product receiving end of the tank to separate the first and second drop zones. Water tight tubes 58 are attached as by welding to the bracket 56 in a separated fashion so that the slots are provided between adjacent tubes 58. The tubes are positioned to surround part of the conveyor and are spaced from the receiving end wall and the bottom of the tank 20. The opposite end of the tubes 58 are similarly attached to a spacer bar 60. The bar 60 is connected to an angle bracket 62 across the top of the tank by a plurality of spaced rods 64 which are axially aligned with the tubes 58. Each of the tubes 58 contains a sufficient quantity of entrapped air so that the grid means 54 is effectively bouyed up in the bath and sag is prevented. Frankfurters F' which are deposited in the bath from the lower portion of the divided basket 14 into drop zone 1, are moved in a path between the mat conveyor and the grid means 54 while frankfurters F" deposited from the basket into drop zone 2 move in a path between grid means 54 and the walls and bottom of the tank.

The pins 52 are cut to a predetermined length so as to extend beyond the tubes 58 and are positioned on the conveyor so as to pass along the slots between the tubes. As such, the pins form a series of adjacently positioned compartments, with one series on each side of and spaced by the grid means 54, for containing separated portions F' and F" of the frankfurters. As the conveyor moves, the separated product portions are swept through the treatment bath by the pins and are moved toward and into separated storage areas at the opposite end of the tank without the product portions being commingled.

Any frankfurters F" clinging to the outer end of the pins at the storage end of the tank are brushed from the pins as each row of pins moves through the tubes 58. In order to handle the frankfurters F', spaced stripper bars 66 are mounted across the tank so that the pins 52 can move in the spaces. The bars 66 are angularly positioned with respect to the mat conveyor to strip any remaining frankfurters F' from the pins moving through the bars and keep them in the storage area. By such an arrangement, the product is prevented from passing through the treatment bath more than once.

An entrance grill retainer 68 is mounted across the tank and is shaped generally to the contour of the tubes 58 in the area where they pass about the idler shaft assembly 30. The retainer 68 is spaced from the tubes a predetermined distance which is sufficient for the pins to pass closely adjacent without touching and yet keep the frankfurters in the compartments as they are moved through the tank. In another embodiment, the front wall of the tank could be fashioned in such a curved manner to eliminate the retainer. Although a product such as frankfurters normally tends to float upwardly in brine, floor spacer bars 70 are fastened to the bottom of the tank and extend upwardly a sufficient distance beyond the end of the pins 52 moving on the lower run of the conveyor. The bars 70 are mounted longitudinally of the tank and are spaced a sufficient distance apart so that the moving pins 52 can easily pass between the bars. In this way, the product being treated is held off the bottom of the tank and a positive enclosure is defined between the bars 70 and the outer end of the pins 52 which prevents the product from being entangled between the outer ends of the pins and the bottom of the tank.

U-shaped guide members 72 are mounted to the angle bracket 56 and extend above the tank to guide the frankfurters F' from the lower portion of the divided basket 14 into drop zone 1. Another set of U-shaped guide members 74 are mounted to the top of the retainer 68 and extend above the tank to guide the frankfurters F" from the upper portion of the divided basket 14 into drop zone 2.

The treatment bath, such as a suitable brine solution, is being continually recirculated by a submerged pump assembly 76. The brine is pumped from the tank through an exit opening 78 into a conduit (not shown). The portion of the brine being recirculated is cooled by conventional heat exchange means (not shown) and the cooled brine is sprayed back into the bath at the product receiving end of the treatment apparatus of this invention.

A filter screen 82 is mounted on top of the pump assembly 76 and across the tank between the bath and the opening into the pump assembly. The screen 82 prevents meat particles, single sausages and other debris being carried in the brine from coming into contact with the working members of the pump. The section of the bath between the filter screen and the rear end of the tank is also a convenient portion of the bath into which additional brine or other chemicals can be manually added to adjust the composition of the bath.

Thus, this invention provides a highly useful apparatus for continually processing and moving discrete portions of a product through a treatment bath without commingling. The rows of spaced pins mounted on the endless conveyor extend above and move through the slotted separator grid which partially surrounds the conveyor. The spaces between the rows of pins provide a series of product receiving pockets. With the pins extending beyond the separator grid at least two adjacent, separated paths of such product receiving pockets are formed. The adjacent portions of the product are simultaneously moved through the treatment bath without mixing the separated portions of the product. From here the frankfurters can be moved to suitable other apparatus for peeling and packaging. Cleaning and maintenance of this apparatus is simplified because of the built-in cleaning equipment cooperating with the pump and the easy access to the operating parts.

Thus, it will be appreciated that all of the recited objects, advantages and features of this invention have been demonstrated as obtainable in a highly practical mechanism and one that is not only simple and positive in operation but also maintains uniform processing conditions. It will be further understood that although this invention has been described with respect to certain specific embodiments, it is not limited thereto, since various modifications of said invention will suggest themselves from the aforesaid description and are intended to be encompassed within the scope of the appended claim wherein there is claimed:

1. A method of treating strands of sausage products in a bath of liquid comprising the steps of arranging separate strands of sausage products in upper and lower sections of divided baskets, moving said baskets longitudinally over the surface of the bath, dropping said strands from said lower sections into said bath at a first drop zone, sequentially dropping said strands from said upper sections into said bath at a second drop zone, said first and second drop zones being aligned with corresponding first and second separate series of compartments for each drop zone in said bath, loosely confining the strands in the compartments so as to prevent the strands confined in any one compartment from being commingled with the strands confined in other compartments while simultaneously moving the compartments so as to move the strands through the bath, and discharging the strands from the compartments after movement of the strands through the bath.

References Cited
UNITED STATES PATENTS

| | | | |
|---|---|---|---|
| 1,947,506 | 2/1934 | Vogt | 99—109 |
| 2,973,277 | 2/1961 | Barnett et al. | 99—109X |
| 3,255,689 | 6/1966 | Kielsmeier et al. | 99—229X |
| 3,282,195 | 11/1966 | Young et al. | 99—254 |

HYMAN LORD, Primary Examiner